United States Patent [19]
Ohmori

[11] Patent Number: 4,829,322
[45] Date of Patent: May 9, 1989

[54] LASER BEAM SCANNING APPARATUS

[75] Inventor: Naoto Ohmori, Osaka, Japan
[73] Assignee: Minolta Camera Kabushiki Kaisha, Osaka, Japan

[21] Appl. No.: 199,308
[22] Filed: May 26, 1988

[30] Foreign Application Priority Data

May 29, 1987 [JP] Japan ................................ 62-136090

[51] Int. Cl.[4] ........................ G01D 9/42; G01D 15/14; H04N 1/21
[52] U.S. Cl. .................................... 346/108; 346/160; 358/302
[58] Field of Search .................... 346/107 R, 108, 160; 358/296, 300, 302; 350/6.7, 6.8

[56] References Cited

U.S. PATENT DOCUMENTS 4,578,689 3/1986 Spencer ................................ 346/108
4,704,698 11/1987 Reiniger ................................ 346/108
4,731,623 3/1988 Oda et al. .

FOREIGN PATENT DOCUMENTS 58-93026 6/1983 Japan .
61-3114 1/1986 Japan .

*Primary Examiner*—C. L. Albritton
*Assistant Examiner*—Mark Reinhart
*Attorney, Agent, or Firm*—Price, Gess & Ubell

[57] ABSTRACT

A laser beam scanning apparatus for beam scanning a medium with the laser beam being deflected by a deflector, comprising a first mirror provided for reflecting the laser beam after deflected by the deflector and a second mirror provided for folding a light path between the first mirror and the recording medium in relation that a first light path between the deflector and the first mirror is intersected with a second light path between the second mirror and the recording medium. The first and second mirrors are arranged so as to be movable in parallel respectively for adjusting a length of scanning line on the recording medium in a direction perpendicular to the scanning line, wherein either one of the first and second mirrors is moved when adjusting said moved mirror has lesser shift amount of the scanning line on the recording medium as compared with the other mirror.

1 Claim, 5 Drawing Sheets

LASER BEAM SCANNING APPARATUS

BACKGROUND OF THE INVENTION

1. Field of the Invention

The present invention relates to a laser beam scanning apparatus and, more specifically, to a laser beam scanning apparatus in which a laser beam from a laser beam generating source is deflected by a deflector, whereby a recording medium is scanned and an image is formed thereon.

2. Description of the Prior Art

Generally, optical apparatuses for printers employing laser beam carrying image information such as shown in Japanese Laid-Open Patent Application Nos. SHO 61-3114 and SHO 58-93026 and Japanese Laid-Open Utility Model Application No. SHO 59-119423 are well known. In optical apparatuses of the above-mentioned type, a distance between a deflector and a recording medium is determined by the width of an image, said distance being 200 mm for A4 size in general. An image reflecting mirror is used for making such a long optical path compact. The elements constituting the optical apparatus should preferably be provided as a unit, so to facilitate the positioning of the apparatus to the main body of the printer, to reduce vibration and to facilitate the care of the apparatus such as exchange of parts.

On the other hand, compared with an electrophotographic copying machine (plane paper copier) utilizing projected images of originals by visible light, higher image quality is required for a printer. Therefore, the optical apparatus is a critical portion dominating the image quality, and various portions thereof should be adjusted when assembled.

Especially, the adjustments of a main scanning magnification (a length of scanning line) as well as of an illuminating position on the recording medium are important. Examples of methods for adjusting the main scanning magnification are the entire optical unit is moved relative to the recording medium, and the image reflecting mirror is moved in the direction of a light axis and the like. Compared with the former method, the latter one facilitates the adjustment as an optical unit and is preferable in view of use of the structure as a unit.

However, the movement of the image reflecting mirror for adjusting the magnification of a main scanning causes a problem in that the illuminating position on the recording medium is interlockingly altered. For example, the change of the illuminating position by adjusting the main scanning magnification becomes a problem in the case of adjusting the main scanning magnification after the adjustment of the illuminating position or adjusting the main scanning magnification with the illuminating position fixed.

SUMMARY OF THE INVENTION

A main object of the present invention is to provide a laser beam scanning apparatus wherein an amount of change of the illuminating position can be put within a permissible range relative to an amount of adjustment for the main scanning magnification.

This and other objects of the invention can be accomplished by providing a laser beam scanning apparatus for beam scanning a recording medium with the laser beam being deflected by a deflector, said apparatus comprising a first mirror provided for reflecting the laser beam after bein deflected by the deflector; a second mirror provided for folding a light path between the first mirror and the recording medium in such a relation that a first light path between the deflector and the first mirror is intersected with a second light path between the second mirror and the recording medium; and the first and second mirror being arranged so as to fulfill the following conditions:

$$0<\theta_1<45^\circ$$

$$0<2\theta_1<\theta_2<\theta_1+90^\circ<135^\circ,$$

where $\theta_1$ and $\theta_2$ represents angles between the mirror surfaces thereof and a plane perpendicular to a beam scanning plane from the deflector to the first mirror, and so as to be movable in parallel, respectively, for adjusting a length of a scanning line on the recording medium in a direction perpendicular to the scanning line, wherein either one of the first and second mirrors is moved when adjusting said moved mirror has a lesser shift amount of the scanning line on the recording medium as compared with the other mirror.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

One embodiment of the present invention will be hereinafter described with reference to the figures.

Figure 1:
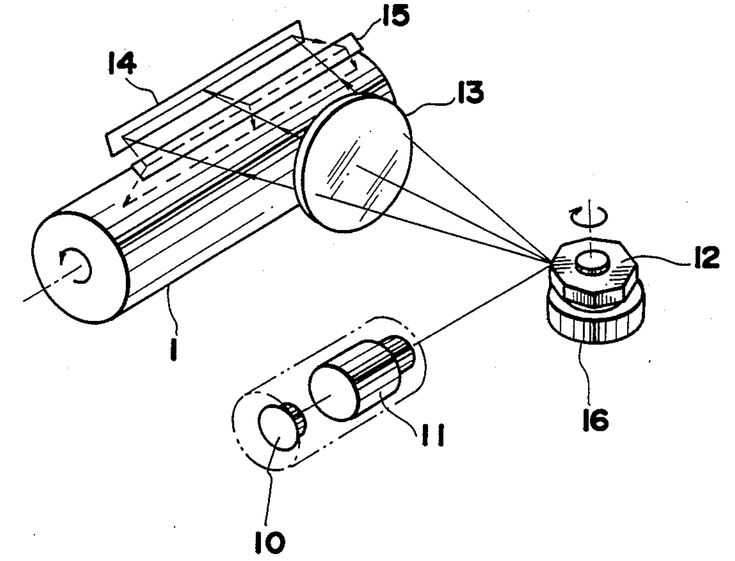
FIG. 1 is a perspective view showing the basic structure of an optical apparatus in accordance with the present invention.
Figure 2:
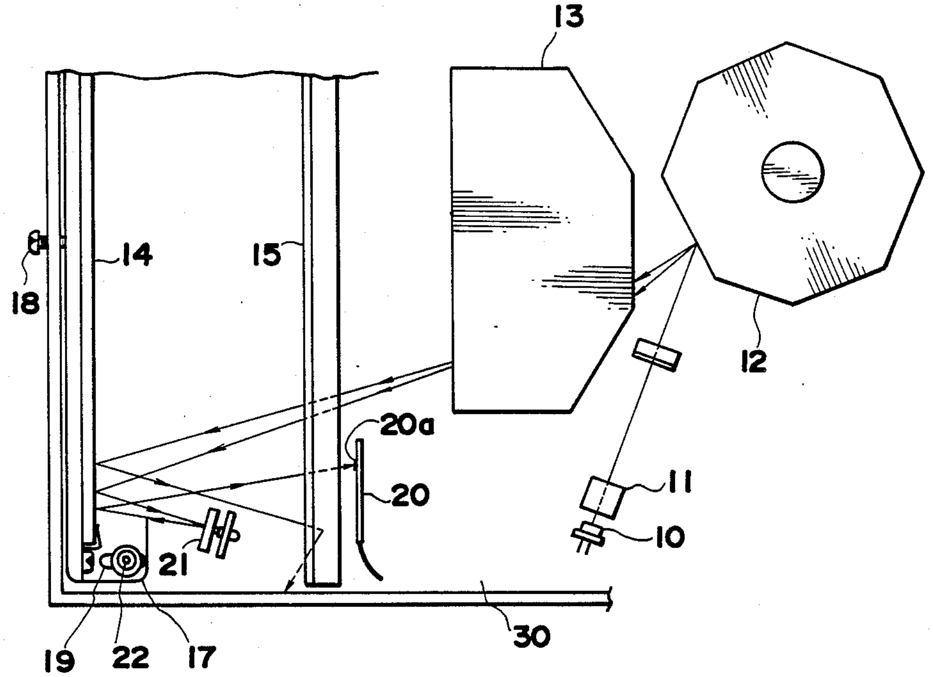
FIG. 2 is a plan view of the main position of the optical apparatus.
Figure 3:
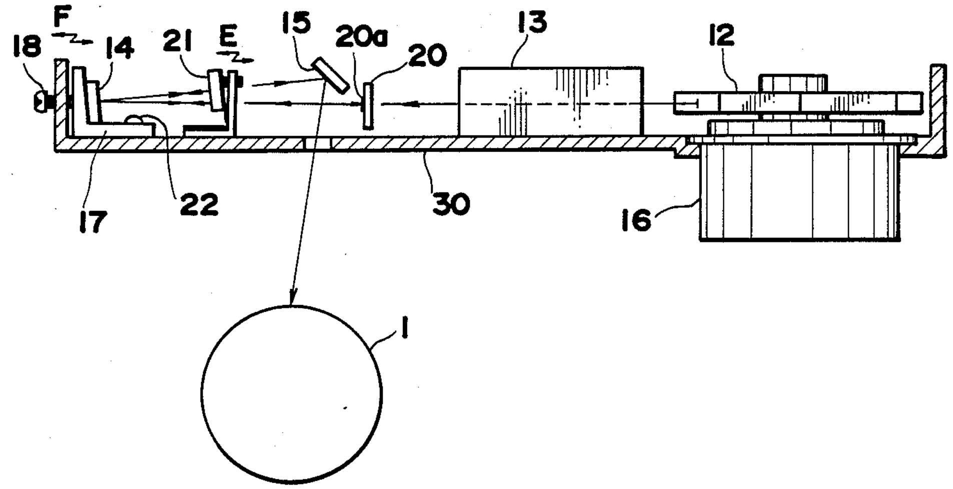
FIG. 3 is a vertical sectional view of FIG. 2.

In the present optical apparatus, a laser beam carrying image information irradiates a photoreceptor provided on a surface of a photoreceptor drum 1, whereby the drum is scanned by the laser beam in the axial direction. As shown in FIG. 1, the apparatus comprises a semiconductor laser 10, a collimator lens 11, a polygon mirror 12, a f$\theta$ lens 13, image reflecting mirrors 14 and 15 and a sensor for detecting a start position for image formation (hereinafter referred to as SOS sensor) 20, and mirrors 21 used only for the sensor shown in FIGS. 2 and 3, and the apparatus is provided on a substrate 30 as a unit.

A laser beam emitted from the semiconductor laser 10 is made into a parallel light by the collimator lens 11 to be guided to a polygon mirror 12. The polygon mirror 12 is rotary driven by a motor 16. By means of this rotation, the laser beam scans the photoreceptor drum 1 in a direction orthogonal to the axis of rotation. In addition, the laser beam forms images on the photoreceptor drum 1 through the f$\theta$ lens 13 and the mirrors 14 and 15 for reflecting images. The f$\theta$ lens 13 equalizes the scanning speed of the laser beam on the photoreceptor drum 1 through beam scanning in association with the rotation of the polygon mirror 12.

The SOS sensor 20 compensates the error of the recording position of each scanning derived from the division error of the deflection planes of the polygon mirror 12. In the SOS sensor 20, the laser beam reflected by the first image reflecting mirror 14 is reflected by the mirror 21 used only for the sensor, and thereafter, it is reflected by the mirror 14 to enter the light receiving portion 20*a* of the SOS sensor 20. The light receiving portion 20*a* is located at a position equivalent to the image forming surface of the photoreceptor drum 1 in order to detect the start position of image formation in the main scanning direction. The incidental light to the light receiving portion 20*a* is adjusted by turning the inclination of the mirror 21 for the sensor in the direction of the arrow E.

Meanwhile, in the optical apparatus such as disclosed in the present invention, the distance between the polygon mirror 12 and the photoreceptor drum 1 becomes as long as 200 mm or more when the maximum image width is set at the letter size or the legal size. In view of the foregoing, in the present embodiment, the image light path is made compact and therefore the optical unit is made small by employing two image reflecting mirrors 14 and 15. As for the SOS light path, the light path is made compact and the optical unit is made small by reflecting the beam twice by the first image reflecting mirror 14.

Figure 4:
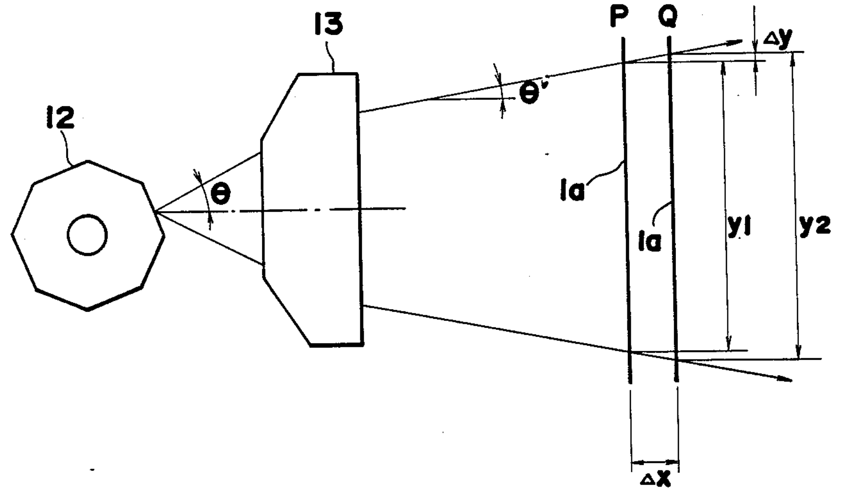
FIG. 4 is a schematic diagram illustrating the relation between the main scanning magnification, the point of focus and the angle of radiation of a f$\theta$ lens.

FIG. 4 shows a basic light path of the optical system with the mirrors omitted therefrom. The beam deflected by the polygon mirror 12 in the direction $\theta$ is turned by the f$\theta$ lens 13 in the direction $\theta'$. Assuming that the initial equivalent position of the photoreceptor is P, the scanning width of the photoreceptor surface 1*a* will be y1 for the angle of deflection $\theta$. On this occasion, by moving the reflecting mirror 14 or 15 in parallel to the light path, the distance between the deflector (polygon mirror) and the equivalent surface of the photoreceptor is changed, whereby the scanning width for the deflection angle $\theta$ is changed. The precision of the scanning width is denoted as the main scanning magnification, which can be adjusted by changing the equivalent position to the photoreceptor.

The first mirror 14 is supported by a supporter 17 which is shiftably provided to the substrate 30. By the manipulation of the screw 18, the supporter 17 is moved in parallel relative to the substrate 30 due to an elongated slit 19 and a screw 22.

The second mirror 15 has a similar construction to that of the first mirror as described above.

Now, assuming that the equivalent position to the photoreceptor moves from P to Q by the distance $\Delta x$ by the movement of the reflecting mirror 14 or 15, the following equation is satisfied.

$$y2-y1=2\Delta y=2\Delta x\cdot\tan\theta' \quad (1)$$

As described above, the main scanning magnification can be adjusted by moving the mirror 14 or 15, which accompanies the change of the position (an illuminating position) where the laser beam reaches the photosensitive member. This change appears on the image as the change of the start position for image formation.

Hereinafter explained is the changes of the length of the light path and the illuminating position in an apparatus constructed such that a light reflected by the second mirror 15 intersects the light path from the polygon mirror 12 to the first mirror 14 by using two mirrors 14 and 15.

Figure 5A:
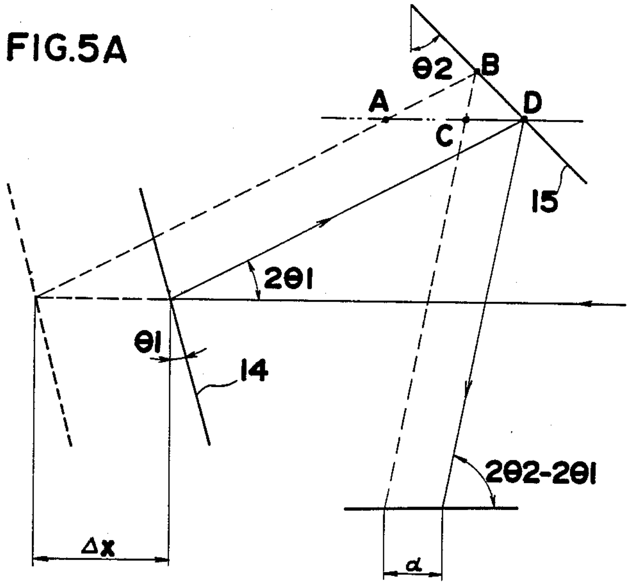
FIGS. 5(A) and 5(B) are explanatory views illustrating the change of a light path when a first mirror is moved.
Figure 5B:
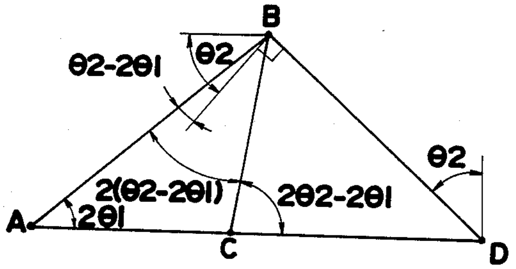

As shown in FIGS. 5(A) and 5(B), in the case where the first mirror 14 is moved leftwardly from the position shown by a solid line to the position shown by a chain line by the distance $\Delta X$ in FIG. 5(A), the amount of change of the light path $\Delta$, i.e., the amount of change of the main scanning magnification is represented as follows:

$$\Delta=\Delta X+\overline{AB}+\overline{BC} \quad (2)$$

If the angles of inclination of the mirrors 14 and 15 to the subscanning direction are defined as $\theta 1$ and $\theta 2$ respectively, the following equations can be composed:

$$\frac{AB}{\sin(90^\circ-\theta 2)}=\frac{AD}{\sin(90^\circ+\theta 2-2\theta 1)} \quad (3)$$
$$AB=AD\cdot\cos\theta 2/\cos(2\theta 1-\theta 2)$$

$$\frac{BC}{\sin 2\theta 1}=\frac{AB}{\sin(180^\circ-2\theta 2+2\theta 1)} \quad (4)$$
$$BC=AB\cdot\sin 2\theta 1/\sin(2\theta 2-2\theta 1)$$

$$AD=\Delta X \quad (5)$$

From the equations (3), (4) and (5), $$AB+BC=AB+AB\cdot\sin 2\theta 1/\sin(2\theta 2-2\theta 1)= \quad (6)$$
$$\frac{AD\cdot\cos\theta 2}{\cos(2\theta 1-\theta 2)}\times\{1+\sin 2\theta 1/\sin(2\theta 2-2\theta 1)\}=$$
$$\frac{\Delta X\cdot\cos\theta 2}{\cos(2\theta 1-\theta 2)}\times\frac{2\sin\theta 2\cdot\cos(2\theta 1-\theta 2)}{\sin 2(\theta 2-\theta 1)}=$$
$$\Delta X\cdot\sin 2\theta 2/\sin 2(\theta 2-\theta 1)$$

Therefore, the following equation is obtained:

$$\Delta=\Delta X+\Delta X\cdot\sin 2\theta 2/\sin 2(\theta 2-\theta 1)$$
$$=2\Delta X\cdot\sin(2\theta 2-\theta 1)\cdot\cos\theta 1/\sin 2(\theta 2-\theta 1) \quad (7)$$

On the other hand, the amount of change $\alpha$ of the illuminating position is represented as follows:

$$\alpha=CD \quad (8)$$
$$=BC\cdot\cos(\theta 2-2\theta 1)/\cos\theta 2$$
$$=\frac{AB\cdot\sin 2\theta 1}{\sin(2\theta 2-2\theta 1)}\times\frac{\cos(\theta 2-2\theta 1)}{\cos\theta 2}$$
$$=\Delta X\cdot\sin 2\theta 1/\sin(2\theta 2-2\theta 1)$$

Figure 6:
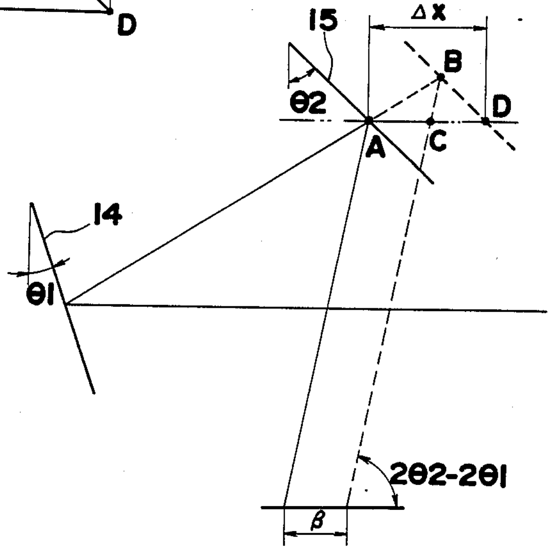
FIG. 6 is an explanatory view illustrating the change of a light path when a second mirror is moved.

Next, the amount of change $\Delta'$ of the light path is represented as follows in the case where the second mirror 15 is moved rightwardly from the position shown by a solid line to the position shown by a chain line by the distance $\Delta X$ in FIG. 6:

$$\Delta'=\overline{AB}+\overline{BC}$$
$$=\Delta X\cdot\sin 2\theta 2/\sin 2(\theta 2-\theta 1) \quad (9)$$

The amount of Δ' is smaller than that of Δ shown by the equation (7) which represents the case where the first mirror 14 is moved.

On the other hand, the amount of change $\beta$ of the illuminating position is represented as follows;

$$\begin{aligned}\beta &= AC \\ &= \frac{AB \cdot \sin 2(\theta 2 - 2\theta 1)}{\sin(2\theta 2 - 2\theta 1)} \\ &= \frac{AD \cdot \cos\theta 2}{\cos(2\theta 1 - \theta 2)} \times \frac{\sin 2(\theta 2 - 2\theta 1)}{\sin(2\theta 2 - 2\theta 1)} \\ &= \frac{\Delta X \cdot 2\cos\theta 2 \cdot \sin(\theta 2 - 2\theta 1)}{\sin(2\theta 2 - 2\theta 1)}\end{aligned} \tag{10}$$

Each of the amounts of change mentioned above are shown in Table 1.

TABLE 1

| | amount of change of the light path | amount of change of the illuminating position |
|---|---|---|
| movement of the mirror 14 | $\frac{2\Delta X \cdot \sin 2(2\theta 2 - \theta 1) \cdot \cos\theta 1}{\sin 2(\theta 2 - \theta 1)}$ | $\frac{\Delta X \cdot \sin 2\theta 1}{\sin 2(\theta 2 - \theta 1)}$ |
| movement of the mirror 15 | $\frac{\Delta X \cdot \sin 2\theta 2}{\sin 2(\theta 2 - \theta 1)}$ | $\frac{2\Delta X \cdot \cos\theta 2 \cdot \sin(\theta 2 - 2\theta 1)}{\sin 2(\theta 2 - \theta 1)}$ |

The change rates of the illuminating position relative to the change of the light path are defined by the following equations wherein PM1 represents the change rate with regard to the movement of the first mirror 14 and PM2 represents the change rate with regard to the movement of the second mirror 15.

$$\begin{aligned}PM1 &= \frac{\sin 2\theta 1}{2\sin(2\theta 2 - \theta 1) \cdot \cos\theta 1} \\ &= \sin\theta 1/\sin(2\theta 2 - \theta 1)\end{aligned} \tag{11}$$

$$\begin{aligned}PM2 &= \frac{2\cos\theta 2 \cdot \sin(\theta 2 - 2\theta 1)}{\sin 2\theta 2} \\ &= \sin(\theta 2 - 2\theta 1)/\sin\theta 2\end{aligned} \tag{12}$$

If the ratio of this change rate is defined as $\gamma$, $$PM1 = \gamma \cdot PM2 \tag{13}$$

In the case where the ratio $\gamma$ is more than "1", the movement of the first mirror 14 provides a greater amount of change of the illuminating position relative to the amount of change of the light path compared with the amount obtained by the movement of the second mirror 15.

The ratio $\gamma$ of less than "1" brings the reverse result. More specifically, $$\frac{\sin\theta 1}{\sin(2\theta 2 - \theta 1)} = \gamma \times \frac{\sin(\theta 2 - 2\theta 1)}{\sin\theta 2} \tag{14}$$

$$\gamma = \frac{\sin\theta 1 \cdot \sin\theta 2}{\sin(2\theta 2 - \theta 1) \cdot \sin(\theta 2 - 2\theta 1)}$$

If the equation of $$\theta 1 = \eta \cdot \theta 2 \tag{15}$$

is fulfilled, $$\gamma = \frac{\sin\eta\theta 2 \cdot \sin\theta 2}{\sin(2 - \eta)\theta 2 \cdot \sin(1 - 2\eta)\theta 2} \tag{16}$$

In the case where two mirrors 14 and 15 are arranged as the present embodiment, the following equation can be obtained since the laser beam is reflected by the first mirror 14 in an upwardly right direction.

$$0 < 2\theta 1 < 90°$$

$$0 < \theta 1 < 45° \tag{17}$$

Since the laser beam is reflected by the second mirror 15 in the counterclockwise direction with respect to the incident light, $$0 < 2\theta 2 - 4\theta 1$$

$$0 < 2\theta 1 < \theta 2 \tag{18}$$

Further, since the laser beam is reflected by the second mirror 15 in the downward direction, $$0 < 2\theta 2 - 4\theta 1 < 180°$$

$$\theta 2 < \theta 1 + 90° \tag{19}$$

The range of the angle of inclination ($\theta 2$) of the second mirror 15 can be obtained as follows from the abovementioned equations (17), (18) and (19).

$$0 < 2\theta 1 < \theta 2 < f1 + 90° = 45° + 90° = 135° \tag{20}$$

Moreover, from the equaton of $2\theta 1 < \theta 2$ and the aforesaid equation (15), i.e., $\theta 1 = \eta \cdot \theta 2$, $$2\theta 1 = 2\eta \cdot \theta 2 < \theta 2$$

$$2\eta < 1$$

$$\eta < 0.5 \tag{21}$$

Figure 7:
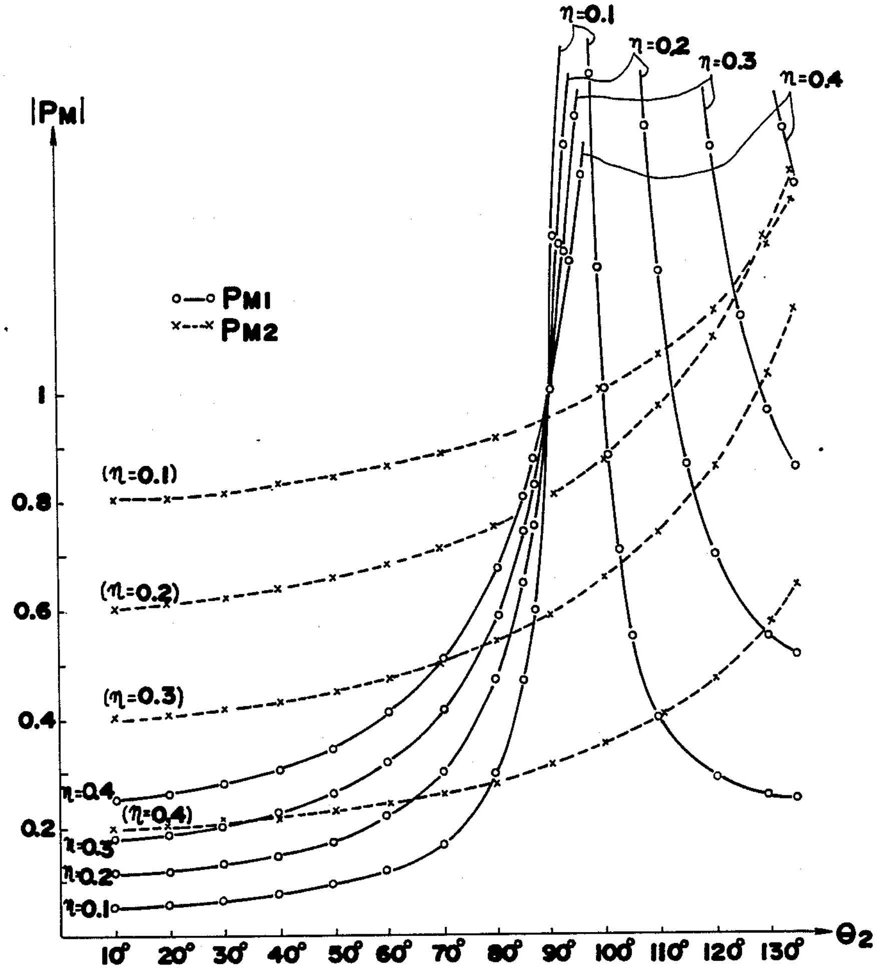
FIGS. 7 and 8 are graphs illustrating the positioning angle of the second mirror.
Figure 8:
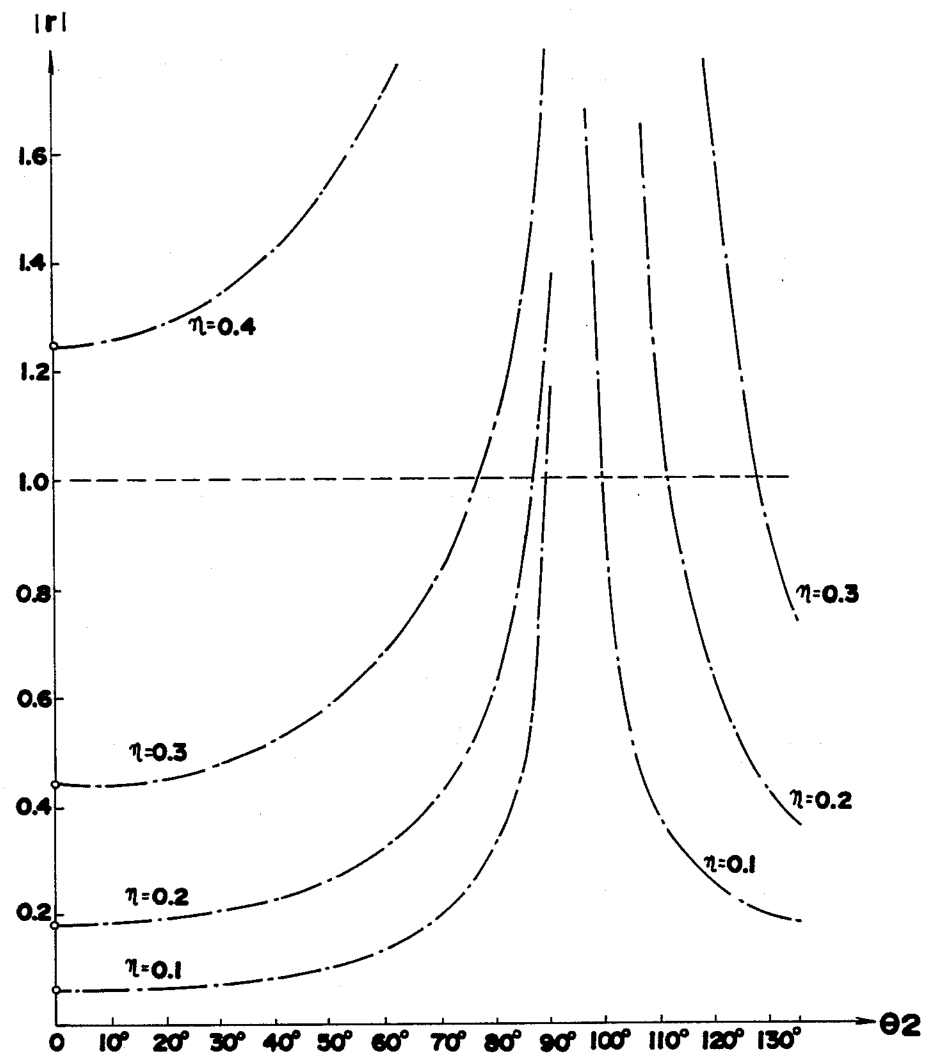

The calculated amounts of PM1 and PM2 are shown by a graph in FIG. 7 and the calculated amounts of $\gamma$ are shown in FIG. 8 with the amount $\eta$ defined as 0.1, 0.2, 0.3 and 0.4. When $\eta = 0.1$, 0.2, 0.3, the inequality of $\eta < 1$ can be obtained at the portion where the angle of inclination $\theta 2$ of the second mirror 15 is in the vicinity of 70° or less, indicating that the main scanning magnification can be adjusted more effectively when the first mirror 14 is moved than when the second mirror 15 is moved.

On the contrary, when $\eta = 0.4$ and $\theta_2 < 90°$, the inequality becomes $\gamma > 1$, so that the main scanning magnification can be adjusted more effectively when the second mirror 15 is moved than the first mirror 14.

As apparent from the above, the apparatus according to the present invention affords a trace of change amount of the illuminating position on the recording medium relative to the amount of adjustment of the main scanning magnification, with the result that the illuminating position does not need to be adjusted with the adjustment of the main scanning magnification.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A laser beam scanning apparatus for beam scanning a medium with the laser beam being deflected by a deflector, comprising:

a first mirror provided for reflecting the laser beam after being deflected by the deflector;

a second mirror provided for folding a light path between the first mirror and the recording medium in such a relationship that a first light path between the deflector and the first mirror is intersected with a second light path between the second mirror and the recording medium, and the first and second mirror being arranged so as to fulfill the following conditions:

$$0<\theta_1<45°$$

$$[0<2\theta_1\leq\theta_1<\theta_1+90°<135°]$$

$$0<2\theta_1<\theta_2<\theta_1+90°<135°$$

where $\theta_1$ and $\theta_2$ represent angles between the mirror surfaces thereof and a plane perpendicular to a beam scanning plane from the deflector to the first mirror, and also to be movable in paralle, respectively, for adjusting a length of scanning line on the recording medium, wherein either one of the first and second mirrors is moved when adjusting and said moved mirror has a lesser shift amount of the scanning line on the recording medium in a direction perpendicular to the scanning line as compared with the other mirror.

* * * * *